Patented Sept. 7, 1937

2,092,325

UNITED STATES PATENT OFFICE 2,092,325

TREATMENT OF MILK PRODUCTS

John H. Nair and Donald E. Mook, Syracuse, N. Y., assignors to The Borden Company, New York, N. Y., a corporation of New Jersey No Drawing. Application September 13, 1934, Serial No. 743,837

8 Claims. (Cl. 99—60)

This invention relates to improvements in methods for treating cream or milk whereby the viscosity or body, and the appearance, whipping quality and other characteristics of the product, including the depth of cream line of the milk, may be improved and more particularly to the treatment of pasteurized cream or milk to compensate for the effect of pasteurization upon the viscosity, whipping quality, cream line and other characteristics of the cream or milk.

As a result of the concentration of population in large urban centers, the distance between the farm dairy and the household consumer has continually lengthened. This has necessitated radical changes in the method of producing, handling and transporting fluid milk and cream, including the extensive use of pasteurization and centrifugal separation. It has been appreciated, however, that centrifugally separated, pasteurized fluid cream is distinctly inferior in body, appearance and whipping quality to the gravity-risen, raw cream previously supplied. Centrifugal separation tears apart the aggregation or clusters of individual fat particles which normally form in milk when left undisturbed. Even aged raw cream obtained by mechanical separation of milk does not approach in viscosity or body, raw cream of equal fat content obtained in skimming the risen cream from pans of stored raw milk. This injury is very markedly increased by pasteurization, which results in a profound upset in the equilibrium between the fat particles and the surrounding serum medium.

It has been previously proposed to alternately heat and cool pasteurized milk and cream for the purpose of increasing the viscosity of the cream. (For example, see the Bergman et al. Patent No. 1,994,541.) However, such previous methods have overlooked certain important considerations in the effect of the treatment upon the viscosity of the product and have not given proper consideration to the many and often conflicting effects of such treatment upon the various characteristics desired in a commercially acceptable product. The previous work has been concerned mainly with obtaining some sort of an increase in the viscosity of the product and the practices followed have, in many instances, included treatments which are actually detrimental to the optimum improvement in viscosity and to the whipping quality and other important characteristics of the product, such as serum separation, elimination of "plug" or the tendency to solidify in the neck of the bottle, and the proper control of the growth of bacteria.

It is an object of the present invention to provide an improved method for treating sweet fluid milk and cream whereby the uniform and controlled regulation of the various qualities required in the finished commercial product may be accomplished. A further object is to provide a process whereby the desired increase in the viscosity of pasteurized cream may be obtained together with the desired improvement in whipping quality, decrease in serum separation, elimination of "plug" and control of bacterial growth. Another object is to provide a process in which the over-treatment of the product with the attendant impairment of stability and other characteristics is avoided. It is also an object to provide a process by which the depth of cream line of milk, or the volume of cream on the milk after standing, may be increased. Another, and more specific object, is to control the heating and cooling operations so as to give the maximum improvement in the desired characteristics of the product. Other objects will become apparent.

In carrying out our improved procedure as applied to cream, the whole milk may be pasteurized and the cream separated from it or, preferably, the cream may be centrifugally separated from the raw milk and may be pasteurized by any of the commercial methods normally employed, for example, as hereinafter described.

To obtain the maximum improvement in body and whipping quality, the hot pasteurized cream is first cooled to a point at or somewhat below the solidification point of the butter fat in the cream. By the solidification point of the butter fat we mean the temperature at which the entire mass of a quantity of the melted butter fat becomes a solid upon cooling, at which point there occurs a slight rise in temperature. This point varies with the season, feed, breed of the cow and possibly other conditions, but generally ranges between 65° and 75° F. It may be determined for any particular cream as hereinafter described.

The cooling following pasteurization may be either rapid or slow. When the temperature of the cream has been lowered to the point of fat solidification, it is preferable to hold it at such temperature for a few minutes. Or the cream may be cooled to a still lower temperature before the heating and cooling operations hereinafter described.

The cream is then slowly warmed to a temperature slightly below the melting point of the butter fat in the cream. This melting point, which is the temperature at which the butter fat becomes transparent upon slow warming and which is determined as hereinafter indicated, is likewise dependent upon the season, feed, breed of cows and generally ranges between 90° F. and 95° F. This warming operation appears to serve the purpose of softening the surfaces of the individual fat particles and predisposes them to the formation of aggregates in the subsequent cooling and aging, which particles appear to adhere rather tenaciously. Gentle and uniform agitation should be used during this warming step to secure the optimum effect. The agitation during this step and where used in the subsequent cooling steps should be such as to give a slow rolling motion to the mass and should be adequate to give the desired rate of heat transfer without being sufficient to cause incipient churning or breaking of the emulsion.

As an illustration of this step of the process, the cream may be slowly warmed to about 80 to 90° F., this temperature varying with the cream. For optimum effect this temperature should be about 4 to 8° below the melting point of the butter fat in the cream. In no case should this rewarming temperature be higher than 3° below the melting point of the butter fat. The liquid may be kept at this temperature for some minutes, but this is not essential. With lower temperatures longer periods of heating may, however, be desirable.

The cream is then subjected to a controlled cooling as hereinafter described. We have found that if the product is slowly cooled after the above described heating step, the ultimate viscosity of the cream will be increased at first, after which it will decrease upon further slow cooling. A product slowly cooled beyond this temperature of maximum viscosity will be less stable and more subject to serum separation when subjected to changes in temperature. We have also found that by rapidly cooling the product, after the desired viscosity is reached, to any lower temperature desired for bottling or storage, the change in viscosity and other characteristics of the product may be arrested and the stability and improved whipping qualities of the product may be retained. In referring to viscosity herein, reference is made to the viscosity of the product after aging, for example, about 24 hours, as is the practice in the dairy industry.

The cooling should be slow in its initial stages, that is, to a temperature selected to give the desired viscosity in the finished product without going below the temperature giving maximum viscosity increase in the product. The subsequent cooling, if any, to the desired storage or bottling temperature should be conducted more rapidly. Optimum improvement with a cream of about 30% butter fat appears to result from a slow cooling of the cream in a vat or tank, for instance, at a rate of about 1 degree per minute, to a temperature between 50 and 55° F. With a cream of higher butter fat content, it is preferred to discontinue the slow cooling at a higher temperature, suitable to give the desired increase in viscosity but insufficient to give the maximum increase in viscosity, thus giving a greater stability than in a product obtained by continuing the slow cooling beyond this maximum point and to the bottling or storage temperature. During this slow cooling period the cream should be gently agitated in a uniform manner, as hereinafter described, but during the rapid cooling period it should be cooled with a minimum of agitation. Also, in the subsequent operations of storage and bottling, methods of handling should be used which will result in a minimum disturbance of the aggregates of fat particles which are in course of formation.

This process is applicable to cream of any fat content or to fluid milk. The effect is more pronounced the higher the percentage of fat, but even with creams containing only 15% butter fat the improvement is of marked commercial significance. Warming of the rebodied cream subsequent to the completion of the process or even after bottling causes little change in its subsequent viscosity, if it is cooled again without agitation. The whipping characteristics of the cream treated as described herein are greatly improved in respect to stiffness of whip, rapidity of whipping and reduced leakage of serum.

The rate, as well as the degree, of cooling are of marked importance in our improved process. By slow cooling we mean cooling such as results from circulating cold water or brine through the walls, coils or pipes in the vat or other equipment containing the cream or milk; for example, cooling at such a rate as to give an average rate of temperature reduction of less than 5° F. per minute and preferably of about 1 to 2° F. per minute. By rapid cooling as used herein, we refer to cooling such as results from passing the cream or milk in thin sheets over a water- or brine-cooled surface; for example, cooling at such a rate as to give an average rate of temperature reduction of over 5° F. per minute and preferably over 10° F. per minute or as rapidly as possible.

If the cream is to be thinned or cut to reduce the butter fat content, it is preferred to add the milk containing less butter fat before the rebodying treatment.

As a specified example of our procedure, the cream may be separated, by centrifugal separation or otherwise, from raw milk preferably heated to about 80 to 85° F. This cream may then be cooled rapidly, as over a surface cooler, to about 40° F. and stored. If it is to be immediately pasteurized, this cooling step may be omitted. In pasteurizing the cream, it may be placed in a vat or tank and its temperature raised to about 145° F. and held at this temperature for about 30 minutes or its equivalent in bacterial destruction. For example, the cream may be held at a higher temperature, for instance, 155° F., for a shorter period of time, for instance, 20 minutes, with a material improvement in the elimination of "plug" and serum separation when treated as herein described. The pasteurized cream may then be rapidly cooled over a surface cooler to lower its temperature to about 40° F., at which temperature it may be stored until needed or, if preferred, it may be rebodied at once.

The cream to be rebodied may be slowly warmed in a vat to approximately 85° F., using gentle agitation in the vat. The heating medium should preferably be cool at the start (for example, about 60° F.) and should be gradually raised in temperature until it has a temperature of about 100 to 120° F. This warming of the cream may be accomplished, for example, in about 20 to 30 minutes.

The cream is thereupon slowly cooled in the vat with gentle agitation until it has reached the desired temperature. This temperature, as indicated above, will depend upon the fat content of the cream, the season of the year and the desired viscosity and may be predetermined by trial for the particular type of cream being treated. Generally speaking, we prefer to slowly cool a cream containing 20% fat to approximately 50 to 55° F. A cream containing 40% fat, on the contrary, is preferably slowly cooled in the vat only to a temperature of about 70 to 75° F. The rate of agitation should be as low as is commensurate with the desired rate of heat exchange, in order to avoid incipient churning and the incorporation of air. With a thinner cream this is of especial importance and a slower rate of rotation of the agitator is required than in a heavier cream.

After the cream has been cooled slowly to the desired temperature, it may be stored at that temperature, or if a lower storage temperature is necessary, it may be rapidly cooled, for example, over a surface cooler to the desired storage temperature, for instance, about 40° F., whereupon it may be stored or distributed for use.

As an alternative method, the cream may be pasteurized as described above, or given a treatment which is its equivalent in bacterial destruction, and then may be slowly cooled in the vat to a temperature below the solidification temperature of the fat, for example, to about 55 to 65° F., depending upon the fat content and the season of the year. It may be held at this temperature for some minutes and then be warmed slowly to 80 to 90° F. and cooled in the vat to about 50° F., or to such higher temperature as may give the desired increase in viscosity with the particular product being treated, at a rate of about 1 to 5° F. per minute. After reaching this temperature, it may be stored or rapidly cooled to such lower temperature as may be desired.

The determination of the exact temperatures to which the cream should be rewarmed and cooled must be made in each operating plant for the product of the local area in the particular season. This can be done by varying the final heating and final slow cooling temperatures to determine those which will give the maximum viscosity, or the desired viscosity before reaching the maximum, to the product after standing a definite time. The uniformity of results depends on the uniformity in the method of handling the raw silk supply and upon identical separating and pasteurizing operations and exact duplication in day by day operation of the rebodying process.

By following the procedures described above, a pasteurized cream having the viscosity and whipping quality equal to that of a gravity-risen raw cream may be obtained. Also a pasteurized cream of low butter fat content may be given the body, viscosity and whipping quality of an ordinary pasteurized cream of very much higher butter fat content. At the same time the resulting product is one in which the tendency to "plug" is eliminated and the separation of serum is materially reduced.

As illustrations of the effect of slow cooling upon the viscosity of rebodied cream, the following are examples of runs in which cream of about 20% and 30% butter fat content were slowly cooled in vats:

*Example No. 1*

| Butter fat (percent) | Cream cooled to— | Time to cool from 86° F. | Body flow time (viscosity) after aging 22 hours at 42° F. |
|---|---|---|---|
| | °F. | Minutes | Seconds |
| 20 | 55 | 22 | 153 (*) |
| 20 | 50 | 27 | 153 (*) |
| 20 | 45 | 38 | 127 (*) |
| 30 | 55 | 18 | 140 (#) |
| 30 | 50 | 22 | 142 (#) |
| 30 | 45 | 34 | 120 (#) |

*Example No. 2*

| Butter fat (percent) | Cream cooled to— | Time to cool from 86° F. | Body flow time (viscosity) after aging 22 hours at 42° F. |
|---|---|---|---|
| 19 | 50 | 16 | 114 (*) |
| 19 | 45 | 21 | 111 (*) |
| 19 | 40 | 27 | 104 (*) |
| 30 | 50 | 25 | 254 (#) |
| 30 | 45 | 32 | 182 (#) |
| 30 | 40 | 46 | 140 (#) |

The viscosities reported above were determined as described in the Journal of Dairy Science, Vol. XVI, page 3, January, 1933, the results marked * being taken at 50° F. with a small bore tip and those marked # being taken at 60° F. with a large bore tip.

Our improved process may also be applied in a similar manner to whole milk, whereupon the volume of risen cream, or the depth of cream line upon storage after treatment, will be substantially increased. The milk may be slowly cooled to give the desired increase in depth of cream line, viscosity and whipping quality of the risen cream, after which it should be rapidly cooled to the desired storage or shipping temperature.

The method used in determining the solidification point of the butter fat, referred to above, is as follows: Introduce 25 cc. of the melted butter fat into glass test tube approximately 1½ inches in diameter by 6 inches long and support the tube in a water bath maintained at a temperature of about 5° F. below the supposed solidification temperature. Stir the fat by means of a thermometer till the mass solidifies, noting the temperature carefully from time to time. After a steady fall the temperature will be seen to rise and the highest point then reached is taken as the solidification point.

The melting point may be determined by the capillary tube method described in the "Methods of Analysis of the Association of Official Agricultural Chemists," 3rd Ed. (1930), p. 317.

It is apparent that many modifications may be made in the procedure described, the particular temperatures, times, etc., being given merely as illustrative. Such changes may be necessary to meet particular conditions or requirements.

The terms used in describing the invention have been used in their descriptive sense and not as terms of limitation and it is intended that all equivalents thereof be included within the scope of the appended claims.

What we claim is:

1. A method of treating cream or milk comprising maintaining it at a temperature below the solidification point of butter fat in it, warming it to not above the melting point of the butter fat in it, slowly cooling it from a temperature slightly below the melting point of the butter fat in the cream or milk to a temperature between about 50 and 75° F. and not lower than that required to give the maximum increase in viscosity of the cream or milk after aging, and thereupon arresting the slow cooling.

2. A method of treating cream or milk comprising maintaining it at a temperature below the solidification point of butter fat in it, warming it to not above the melting point of the butter fat in it, slowly cooling it from a temperature slightly below the melting point of the butter fat in the cream or milk to a temperature between about 50 and 75° F. and not lower than that required to give the maximum increase in viscosity of the cream or milk after aging and rapidly cooling the cream or milk to the desired storage or bottling temperature.

3. A method of treating pasteurized cream or milk comprising maintaining it at a temperature below the solidification point of butter fat in it warming the cream or milk to a temperature slightly below the melting point of the butter fat, and slowly cooling it to within the temperature range of 50° to 75° F. and to the temperature of maximum improvement in whipping quality, any subsequent cooling to the storage temperature being done at a substantially increased rate.

4. A method for treating cream or milk comprising maintaining it at a temperature below the solidification point of butter fat in it warming the cream or milk to a temperature slightly below the melting point of the butter fat, cooling it at a rate of about 1 to 5° F. per minute to a temperature within the range of 50 to 75° F. and until the maximum increase in viscosity is reached and thereafter rapidly cooling to the desired temperature.

5. A method of treating cream comprising maintaining it at a temperature below the solidification of butter fat in it, warming it to a temperature slightly below the melting point of the butter fat in it, cooling it slowly to a temperature within the range of 50 to 75° F. and at which the maximum increase in viscosity of the cream is obtained, and arresting the slow cooling at that point.

6. A method of treating cream comprising maintaining it at a temperature below the solidification point of butter fat in it, warming it to a temperature slightly below the melting point of the butter fat in it, cooling it slowly to a temperature within the range of 50 to 75° F. and at which the maximum increase in viscosity of the cream is obtained and thereafter rapidly cooling the cream to the desired temperature.

7. An improved method of treating pasteurized sweet cream to obtain uniformity of viscosity increase, comprising maintaining it at a temperature below the solidification point of butter fat in it, warming it in a container with gentle agitation to a temperature slightly below the melting point of the butter fat in it, cooling it slowly in said container to a temperature within the range of 50 to 75° F. but not lower than that required to give the maximum increase in viscosity after aging, said temperature being lower the lower the fat content of the cream, and thereafter rapidly cooling the cream to the desired temperature.

8. A method of treating pasteurized cream containing about 15 to 40% butter fat, comprising maintaining it at a temperature below the solidification point of the butter fat in it, warming the cream to a temperature of 3° to 10° F. below the melting point of the butter fat in it, cooling the cream first at a rate of about 1° to 5° F. per minute to a temperature within the range of 50° to 75° F., the temperatures within this range to which the cream is slowly cooled varying substantially in accordance with the fat content of the cream and being lower the lower the fat content of the cream, and thereupon rapidly cooling the cream to the desired storage temperature.

JOHN H. NAIR.
DONALD E. MOOK.